(12) United States Patent
Yu et al.

(10) Patent No.: US 12,111,080 B2
(45) Date of Patent: Oct. 8, 2024

(54) HEAT-STORAGE MEDIUM CONVEYING SYSTEM FOR SOLAR-THERMAL POWER PLANT

(71) Applicant: ZHEJIANG COSIN SOLAR TECHNOLOGY CO., LTD., Hangzhou (CN)

(72) Inventors: Zhiyong Yu, Hangzhou (CN); Yaping Tang, Hangzhou (CN); Hui Zhou, Hangzhou (CN); Kai Zhou, Hangzhou (CN); Wenjian Bi, Hangzhou (CN); Feng Sun, Hangzhou (CN); Juan Tang, Hangzhou (CN); Guokai Tong, Hangzhou (CN)

(73) Assignee: Zhejiang Cosin Solar Technology Co., Ltd., Hangzhou (CN)

( * ) Notice: Subject to any disclaimer, the term of this patent is extended or adjusted under 35 U.S.C. 154(b) by 413 days.

(21) Appl. No.: 17/763,202

(22) PCT Filed: Sep. 22, 2020

(86) PCT No.: PCT/CN2020/116730
§ 371 (c)(1),
(2) Date: Mar. 24, 2022

(87) PCT Pub. No.: WO2021/057700
PCT Pub. Date: Apr. 1, 2021

(65) Prior Publication Data
US 2022/0341629 A1    Oct. 27, 2022

(30) Foreign Application Priority Data

Sep. 27, 2019   (CN) .......................... 201910929445.0
Jul. 27, 2020   (CN) .......................... 202010733930.3

(51) Int. Cl.
F24S 60/10      (2018.01)
F17D 1/14       (2006.01)
(Continued)

(52) U.S. Cl.
CPC ................ F24S 60/10 (2018.05); F17D 1/14 (2013.01); F24S 80/30 (2018.05); F28D 20/02 (2013.01);
(Continued)

(58) Field of Classification Search
CPC .. F24S 60/10; F24S 80/30; F17D 1/14; F28D 20/02; F28D 20/028; F28D 2020/0047
See application file for complete search history.

(56) References Cited

FOREIGN PATENT DOCUMENTS

CN          202928422 U    *   5/2013
CN          103292485 A        9/2013
(Continued)

OTHER PUBLICATIONS

English Translation CN-206522933-U (Year: 2017).*
(Continued)

*Primary Examiner* — Shafiq Mian
(74) *Attorney, Agent, or Firm* — Zhu Lehnhoff LLP

(57) ABSTRACT

The invention provides a heat-storage medium conveying system for a solar-thermal power plant. The system includes a high-level tank subsystem including a high-level tank used to store the heat-storage medium. The system further includes a heat-storage medium transport subsystem. The high-level tank subsystem is connected with the heat-storage medium transport subsystem. The heat-storage medium transport subsystem includes a low-level tank. A mounting height of the low-level tank is lower than that of the high-level tank. A volume of the low-level tank is smaller than a volume of the high-level tank. The heat-storage medium can enter the low-level tank from the high-level (Continued)

tank partially or completely by its own gravity. The low-level tank is provided with a conveying pump, and the heat-storage medium is pumped out of the low-level tank through the conveying pump. The invention solves the problems such as construction cost, operation and maintenance cost brought about by using the vertical long-shaft submerged molten salt pump, while avoiding the potential safety hazards in the design of large and small tanks or high-level and low-level tanks.

18 Claims, 3 Drawing Sheets

(51) Int. Cl.
F24S 80/30 (2018.01)
F28D 20/02 (2006.01)
F28D 20/00 (2006.01)

(52) U.S. Cl.
CPC .... *F28D 20/028* (2013.01); *F28D 2020/0047* (2013.01)

(56) References Cited

FOREIGN PATENT DOCUMENTS

| CN | 206522933 U | * | 9/2017 | |
| CN | 209116560 U | * | 7/2019 | ........... F24H 7/0433 |
| CN | 110701801 A | | 1/2020 | |

OTHER PUBLICATIONS

English Translation CN-202928422-U (Year: 2013).*
English Translation CN-209116560-U (Year: 2019).*
International Search Report, issued in PCT/CN2020/116730, dated Dec. 30, 2020.
Written Opinion, issued in PCT/CN2020/116730, dated Dec. 30, 2020.

* cited by examiner

HEAT-STORAGE MEDIUM CONVEYING SYSTEM FOR SOLAR-THERMAL POWER PLANT

BACKGROUND OF THE INVENTION

Field of the Invention

The invention belongs to the field of solar-thermal power generation, particularly to a heat-storage medium conveying system for a solar-thermal power plant.

Description of the Prior Art

There are various ways to utilize solar energy, including technologies such as photovoltaic generation and solar-thermal power generation. Depending on the structural form of the solar concentration mirrors and the heat receiver, the solar-thermal power generation can be classified into the trough solar-thermal power generation, the tower solar-thermal power generation, the disc solar-thermal power generation, and the linear Fresnel solar-thermal power generation.

To make the solar-thermal power generation technology emerge among various power generation technologies and ultimately achieve a significant breakthrough in cost, there are at least two problems to be solved, equipment reliability and equipment investment reduction through optimization for the system structure.

For a solar-thermal power plant based on the trough, the tower, the disc, or the linear Fresnel technology, two-nutrient nitrate molten salts (60% NaNO3+40% KNO3) is employed as the heat storage media, the large vertical vault storage tank is used as the storage container for the heat-storage medium, and the vertical long-shaft submerged molten salt pump mounted at the top of the storage tank is used as the conveying pump. However, there are two problems due to the limitation in using the vertical long-shaft submerged molten salt pump. One problem: a large amount of molten salt in the high-temperature molten salt storage tank and the low-temperature molten salt storage tank cannot be used due to the limitation in using the vertical long-shaft submerged molten salt pump, which causes the procurement cost of molten salt and the production cost of storage tanks to rise; for example, for a 100 MW tower solar-thermal power generation station with a scale of storing the heat for 12 h, the amount of molten salt that cannot be used is about 6000 t, so the height of the molten salt storage tank should be increased by 1 m each, which leads the cost to be as much as 20 million to 30 million. The other problem is: the vertical long-shaft submerged molten salt pump has difficulties in the design and manufacturing, and there are only a handful of manufacturers in the world that can produce long-shaft submerged molten salt pumps for the tower solar-thermal power plants with a higher price and longer supply cycle; furthermore, the shaft of the vertical long-shaft submerged pump comprises multiple stages with a length of 16 m or even 18 m, which requires more for assembly and hoisting, and the bearing bush located in the submerged part needs to be replaced regularly, which causes the maintenance time to be as long as half a month, so that the operation and maintenance costs and the potential risks in operation are high and the development of the solar-thermal power generation industry cannot be facilitated.

Although some solutions have been proposed (such as the design of using large and small tanks, i.e., mounting the molten salt pumps on the small tanks), the safety problems of the small tanks have not been solved. For example, the problem of controlling the liquid level of the small tank and causing full liquid once the small tank fails to seal; the problem of thermal stress between large tanks and small tanks has not been solved satisfactorily. Therefore, even if a solution has been proposed, it was not adopted (it was not adopted in the first batch of solar-thermal power generation demonstration projects in China).

The Chinese Patent with Grant No. CN103292485B and title "MOLTEN SALT HEAT STORAGE AND EXCHANGE SYSTEM FOR SOLAR THERMAL POWER GENERATION" discloses a molten salt heat storage and exchange system for solar thermal power generation. The molten salt heat storage system includes a low-temperature storage tank and a high-temperature storage tank. A low-temperature molten salt pump for regulating the flow rate of molten salt fed into a solar heater is arranged on a pipe at the bottom of the low-temperature storage tank, and a high-temperature molten salt pump is used for regulating the flow rate of molten salt fed into the heat exchange system is arranged at the bottom of the high-temperature storage tank. The low-temperature molten salt pump and the high-temperature molten salt pump are horizontally mounted at the bottoms of the storage tanks, and the mounting positions are lower than the ground level. Equipment of the molten salt heat exchange system is of a heat-exchange coil structure.

Although the invention mentioned above avoids using the vertical long-shaft submerged molten salt pump, the invention still fails to solve the problem of rising cost caused by a large amount of unusable salt, and in addition, the invention fails to eliminate the unsafe factor caused by the combination of high-level tanks and low-level tanks.

Therefore, the subject of the present invention is solving the problems with a stable solution, i.e., properly solving the uprising construction cost and maintenance cost and the potential operation safety risks caused by the vertical long-shaft submerged molten salt pump can be, in addition, avoiding the safety hazards in the design of the large and small tanks or the high-level tanks and low-level tanks.

SUMMARY OF THE INVENTION

In view of the drawbacks in the prior art, an objective of the invention is to provide a heat-storage medium conveying system for a solar-thermal power plant. The technical solution of the present invention is as follows:

A heat-storage medium conveying system for a solar-thermal power plant includes a high-level tank subsystem, the high-level tank subsystem including a high-level tank used to store the heat-storage medium, the system further includes a heat-storage medium transport subsystem;

the high-level tank subsystem is connected with the heat-storage medium transport subsystem;

the heat-storage medium transport subsystem includes a low-level tank; a mounting height of the low-level tank is lower than that of the high-level tank; a volume of the low-level tank is smaller than a volume of the high-level tank; the heat-storage medium may enter the low-level tank from the high-level tank partially or completely by its own gravity; the low-level tank is provided with a conveying pump, and the heat-storage medium is pumped out of the low-level tank through the conveying pump.

Optionally, the heat-storage medium transport subsystem further includes an uninterrupted compressed gas source;

the uninterrupted compressed gas source is communicated with a gas-phase space of the low-level tank through a gas source pipeline, and the gas source pipeline forms a first pipe path;

the uninterrupted compressed gas source increases a gas pressure in the low-level tank to decrease a liquid level of the heat-storage medium in the low-level tank by inflating the low-level tank.

Optionally, the heat-storage medium transport subsystem further includes a first valve assembly;

the first valve assembly is used to adjust an inflation volume provided by the uninterrupted compressed gas source for the low-level tank;

the first valve assembly is disposed on the first pipe path.

Optionally, the first valve assembly includes two valve groups connected in parallel; each of the valve groups includes three valves connected in series, i.e., two check valves and an intake adjustment valve disposed between the two check valves.

Optionally, the heat-storage medium transport subsystem further includes a second valve assembly;

the second valve assembly elevates the liquid level of the heat-storage medium in the low-level tank by reducing the gas pressure in the low-level tank;

the low-level tank is provided with a first gas exhaust pipeline, and the first gas exhaust pipeline forms a second pipe path;

the second valve assembly is disposed on the second pipe path.

Optionally, the second valve assembly includes two valve groups connected in parallel; each of the valve groups includes two valves connected in series, i.e., an exhaust adjustment valve and a check valve.

Optionally, the heat-storage medium transport subsystem further includes a low-level tank liquid level sensor; the low-level tank liquid level sensor is mounted on the low-level tank for detecting the liquid level of the heat-storage medium in the low-level tank.

Optionally, the heat-storage medium transport subsystem further includes a high-low-level tank isolation valve;

a first pipeline is disposed between the high-level tank and the low-level tank, the high-level tank is connected with the low-level tank through the first pipeline, and the first pipeline therebetween forms a third pipe path; the high-low-level tank isolation valve is disposed on the third pipe path.

Optionally, the heat-storage medium transport subsystem further includes a temperature regulator;

the uninterrupted compressed gas source is connected with an inlet of the temperature regulator through a pipeline, and the pipeline connecting therebetween forms a fourth pipe path.

Optionally, the heat-storage medium transport subsystem further includes a heater; the heater is located on the fourth pipe path.

Optionally, the heat-storage medium transport subsystem further includes a gas pressure adjustment valve;

an outlet of the temperature regulator is connected with a second gas exhaust pipeline, and the gas pressure adjustment valve is disposed on the second gas exhaust pipeline.

Optionally, the heat-storage medium transport subsystem further includes a temperature sensor; the temperature sensor is mounted on the temperature regulator.

Optionally, the heat-storage medium transport subsystem further includes a flexible connector; the flexible connector is disposed on the third pipe path, and located between the low-level tank and the high-low-level tank isolation valve.

Optionally, the heat-storage medium transport subsystem further includes a fourth valve assembly; the fourth valve assembly is used to adjust a volume and a flow rate of a gas entering the temperature regulator; the fourth valve assembly is disposed on the fourth pipe path.

Optionally, the fourth valve assembly includes an adjustment valve and a check valve.

Optionally, the heat-storage medium transport subsystem further includes a third valve assembly; when the first pipe path and the second pipe path share part of the pipeline, the third valve assembly is disposed on the shared pipeline.

Optionally, the heat-storage medium transport subsystem further includes a conveying pump outlet recirculation valve, wherein a second pipeline is disposed between the high-level tank and the low-level tank; one end of the second pipeline is connected with an inlet of the high-level tank, and the other end of the second pipeline is connected with an outlet of the conveying pump; the second pipeline forms a fifth pipe path, and the heat-storage medium may be pumped into the high-level tank from the low-level tank along the fifth pipe path; the conveying pump outlet recirculation valve is disposed on the fifth pipe path.

A heat-storage medium conveying system for a solar-thermal power plant includes a high-level tank subsystem, a heat-storage medium heat absorption subsystem, a heat-storage medium heat exchange subsystem and a heat-storage medium transport subsystem;

the high-level tank subsystem includes a high-temperature heat-storage medium high-level tank used to store a high-temperature heat-storage medium and/or a low-temperature heat-storage medium high-level tank used to store a low-temperature heat-storage medium;

the heat-storage medium transport subsystem includes a high-temperature heat-storage medium transport subsystem and/or a low-temperature heat-storage medium transport subsystem;

the high-level tank subsystem is connected with the heat-storage medium transport subsystem; the high-temperature heat-storage medium transport subsystem is disposed corresponding to the high-temperature heat-storage medium high-level tank; the high-temperature heat-storage medium transport subsystem includes a high-temperature heat-storage medium low-level tank;

a mounting height of the high-temperature heat-storage medium low-level tank is lower than that of the high-temperature heat-storage medium high-level tank; a volume of the high-temperature heat-storage medium low-level tank is smaller than a volume of the high-temperature heat-storage medium high-level tank; the high-temperature heat-storage medium may enter the high-temperature heat-storage medium low-level tank from the high-temperature heat-storage medium high-level tank partially or completely by its own gravity; the high-temperature heat-storage medium low-level tank is provided with a high-temperature heat-storage medium conveying pump;

an outlet of the high-temperature heat-storage medium conveying pump is connected with the heat-storage medium heat exchange subsystem and the high-temperature heat-storage medium high-level tank respectively; the high-temperature heat-storage medium is pumped into the heat-storage medium heat exchange subsystem from the high-temperature heat-storage medium low-level tank;

the low-temperature heat-storage medium transport subsystem is disposed corresponding to the low-temperature heat-storage medium high-level tank; the low-temperature heat-storage medium transport subsystem includes a low-temperature heat-storage medium low-level tank; a mounting height of the low-temperature heat-storage medium low-level tank is lower than that of the low-temperature heat-storage medium high-level tank; a volume of the low-temperature heat-storage medium low-level tank is smaller than a volume of the low-temperature heat-storage medium high-level tank; the low-temperature heat-storage medium may enter the low-temperature heat-storage medium low-level tank from the low-temperature heat-storage medium high-level tank partially or completely by its own gravity; the low-temperature heat-storage medium low-level tank is provided with a low-temperature heat-storage medium conveying pump;

an outlet of the low-temperature heat-storage medium conveying pump is connected with the heat-storage medium heat absorption subsystem and the low-temperature heat-storage medium high-level tank respectively; the low-temperature heat-storage medium is pumped into the heat-storage medium heat absorption subsystem from the low-temperature heat-storage medium low-level tank.

Compared with the prior art, the present invention has the following beneficial effects:

1. In the invention, through the design of high-level and low-level tanks, problems of high costs, high difficulties in design and manufacturing, high failure rate, and frequent maintenance caused by using the long-shaft molten salt pump in the conventional solar power station are solved, and the problem of rising costs caused by the large amount of unavailable heat-storage medium is also solved.

2. In the invention, the safe operation of high-level and low-level tanks is ensured with a set of compressed-gas liquid-level adjustment systems, a set of fail-safe leak-proof systems, and the flexible connector, so that the unsafe factors brought by the combination of high-level and low-level tanks are eliminated.

3. In the invention, the flexible connector is used to ensure that the thermal stress between the low-temperature heat-storage medium high-level tank and/or the high-temperature heat-storage medium high-level tank and the corresponding low-level tanks is fully released, so as to ensure intrinsic safety (since a large thermal expansion displacement occur when the hot state and the cold state change during the operation of the heat-storage medium storage tank).

4. In the invention, the fail-safe leak-proof system includes the uninterrupted compressed gas source, the temperature regulator, the gas pressure adjustment valve, the high-low-level tank isolation valve, the temperature sensor, and the pipelines connecting therebetween; and the safe isolation is guaranteed with the fail-safe leak-proof system when the isolation is required, e.g., when the low-level tank needs to be repaired, when the flexible connector needs to be replaced and when the uninterrupted compressed gas source fails.

5. In the invention, the heater is disposed on the fourth pipe path. When it is necessary to thaw the solidified heat-storage medium on the third pipe path, the heater heats the gas fed into the temperature regulator by the uninterrupted gas source, which saves the time for defrosting the solidified heat-storage medium on the third pipe path.

6. In the invention, the fourth valve assembly is disposed on the fourth pipe path, which on the one hand may control the gas pressure in the temperature regulator and on the other hand acts to regulate the cooling or melting rate; in addition, once the temperature regulator 8 leaks, the heat-storage medium may also be prevented from leaking out by controlling the pressure on the gas side to be higher than the pressure on the heat-storage medium side.

7. In the invention, the uninterrupted compressed gas source, the first valve assembly, and the second valve assembly serve as the compressed-gas liquid-level adjustment system of the system, which ensures that the liquid level of the low-level tank may be adjusted freely during operation.

BRIEF DESCRIPTION OF THE DRAWINGS

The other features, objects and advantages of the present disclosure will become apparent by reading the detailed destinations made for non-restrictive embodiments with reference to the drawings.

DESCRIPTION OF THE PREFERRED EMBODIMENTS

The present invention is described in detail with reference to the particular examples below. The following particular examples will be conducive to further understanding by those skilled in the art on the present invention, but is not intended to limit the present invention in any forms. It should be pointed out that for those of ordinary skill in the art, the present invention can be transformed and modified in many ways without departing from the spirit of the present invention. All of these fall within the scope of protection of the present invention.

Embodiment One

Figure 1:
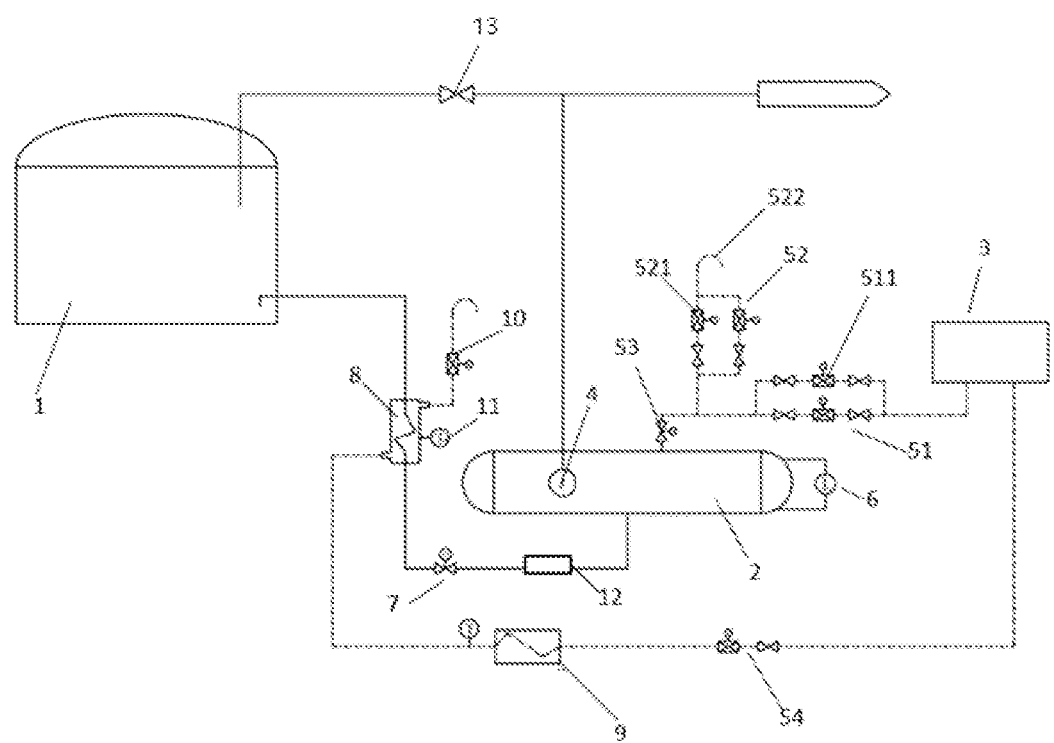
FIG. 1 is a view of a heat-storage medium conveying system for a solar-thermal power plant according to a first embodiment of the invention.

As shown in FIG. 1, the embodiment discloses a heat-storage medium conveying system for a solar-thermal power plant including a high-level tank subsystem, the high-level tank subsystem including a high-level tank 1 used to store the heat-storage medium and a heat-storage medium transport subsystem; the high-level tank subsystem is connected with the heat-storage medium transport subsystem.

In the embodiment, the heat-storage medium is a molten salt, which is only an example. The invention will not specifically define the heat-storage medium. The high-level tank is a molten salt storage tank.

The heat-storage medium transport subsystem includes a low-level tank 2 and an uninterrupted compressed gas source 3;

a mounting height of the low-level tank 2 is lower than that of the high-level tank 1; a volume of the low-level tank 2 is smaller than a volume of the high-level tank 1; the heat-storage medium may enter the low-level tank from the high-level tank partially or completely by its own gravity; the low-level tank is provided with a conveying pump 4, and the heat-storage medium is pumped out of the low-level tank through the conveying pump.

the uninterrupted compressed gas source is communicated with a gas-phase space of the low-level tank through a gas source pipeline, and the gas source pipeline forms a first pipe path; the uninterrupted compressed gas source increases a gas pressure in the low-level tank to decrease a liquid level of the heat-storage medium in the low-level tank by inflating the low-level tank.

In the embodiment, the conveying pump is a molten salt pump, and the uninterrupted compressed gas source 3 is a buffer gas storage tank. A gas in the buffer gas storage tank may be an air or gases other than air that do not chemically react with the heat-storage medium such as nitrogen and so on. The invention does not define the specific type of the gas.

The heat-storage medium transport subsystem further includes a first valve assembly 51, a second valve assembly 52 and a third valve assembly 53.

The first valve assembly is used to adjust an inflation volume provided by the uninterrupted compressed gas source for the low-level tank; the first valve assembly 51 is disposed on the first pipe path. When a liquid level of the low-level tank is high, the first valve assembly is opened to prevent the liquid level of the low-level tank from being high.

In the embodiment, the first valve assembly comprises two valve groups connected in parallel; each of the valve groups comprises three valves connected in series, i.e., two check valves and an intake adjustment valve 511 disposed between the two check valves.

The second valve assembly 52 elevates the liquid level of the heat-storage medium in the low-level tank by reducing the gas pressure in the low-level tank; the low-level tank is provided with a first gas exhaust pipeline 522, and the first gas exhaust pipeline forms a second pipe path; the second valve assembly is disposed on the second pipe path. When a liquid level of the low-level tank is low, the second valve assembly is opened to prevent the liquid level of the low-level tank from being low. In the embodiment, a height of an outlet of the first gas exhaust pipeline 522 is the same as a highest liquid level of the high-level tank 1.

It should be noted that if the uninterrupted compressed gas source 3 provides the air, the outlet of the first gas exhaust pipeline 522 may be directly communicated with the atmosphere. If the uninterrupted compressed gas source 3 provides the gas other than the air, such as the nitrogen, the issue of recovering the relevant gas should be considered, and the outlet of the first gas exhaust pipeline 522 may be connected with a gas recovery apparatus, wherein the gas recovered by the apparatus may be further considered to be back into the uninterrupted compressed gas source 3.

In the embodiment, the second valve assembly comprises two valve groups connected in parallel; each of the valve groups comprises two valves connected in series, i.e., an exhaust adjustment valve 521 and a check valve.

When the first pipe path and the second pipe path share part of the pipeline, the third valve assembly 53 is disposed on the shared pipeline. In the embodiment, the third valve assembly 53 includes a check valve.

The heat-storage medium transport subsystem further includes a low-level tank liquid level sensor 6, a high-low-level tank isolation valve 7, a temperature regulator 8, a heater 9, a gas pressure adjustment valve 10, a temperature sensor 11, a fourth valve assembly 54 and a flexible connector 12.

In the embodiment, the temperature regulator 8 is an air cooler/heater. The heater 9 is an electric heater.

The low-level tank liquid level sensor 6 is mounted on the low-level tank 2 for detecting the liquid level of the heat-storage medium in the low-level tank 2. When the low-level tank liquid level sensor 6 issues a low-level alarm, the second valve assembly 52 is opened to elevate the liquid level of the low-level tank 2 to a normal operating liquid level; when the low-level tank liquid level sensor 6 issues a high-level alarm, the first valve assembly 51 is opened to lower the liquid level of the low-level tank 2 to the normal operating liquid level.

A first pipeline is disposed between the high-level tank 1 and the low-level tank 2, the high-level tank 1 is connected with the low-level tank 2 through the first pipeline, and the first pipeline therebetween forms a third pipe path; the high-low-level tank isolation valve 7 is disposed on the third pipe path. Once the low-level tank 2 fails and needs to be shut down for maintenance, the flow of the heat-storage medium between the high-level tank 1 and the low-level tank 2 is cut off through the high-low-level tank isolation valve 7, and then a compressed air is introduced into the temperature regulator 8 to freeze the heat-storage medium, so as to further completely cut off the flow of the heat-storage medium between the high-level tank 1 and the low-level tank 2.

The uninterrupted compressed gas source 3 is connected with an inlet of the temperature regulator 8 through a pipeline, and the pipeline connecting therebetween forms a fourth pipe path. The heater 9 is located on the fourth pipe path. An outlet of the temperature regulator 8 is connected with a second gas exhaust pipeline, and the gas pressure adjustment valve 10 is disposed on the second gas exhaust pipeline. The temperature sensor 11 is mounted on the temperature regulator 8.

The fourth valve assembly 54 is used to adjust a volume and a flow rate of a gas entering the temperature regulator 8; the fourth valve assembly is disposed on the fourth pipe path and located between the heater 9 and the uninterrupted compressed gas source 3. Meanwhile, the fourth valve assembly 54 is used to control the air pressure in the temperature regulator 8, so that on the one hand the cooling speed may be adjusted; in addition, once the pipeline at the heat-storage medium side in the temperature regulator 8 fails and leaks, the heat-storage medium may also be prevented from leaking by controlling, in the temperature regulator 8, the pressure at the gas side to be higher than the pressure at the heat-storage medium side.

In the embodiment, the fourth valve assembly 54 includes an adjustment valve and a check valve.

The flexible connector 12 is disposed on the third pipe path, and located between the low-level tank 2 and the high-low-level tank isolation valve. The flexible connector 12 may be a bellows, which functions to realize the flexible connection of the high-level tank 1 and the low-level tank 2, and reduces the thermal stress between the high-level tank and the low-level tank when the high-level tank 1 expands and contracts due to temperature changes.

The heat-storage medium transport subsystem further includes a conveying pump outlet recirculation valve 13, wherein a second pipeline is disposed between the high-level tank and the low-level tank; one end of the second pipeline is connected with an inlet of the high-level tank, and the other end of the second pipeline is connected with an outlet of the conveying pump; the second pipeline forms a fifth pipe path, and the heat-storage medium may be pumped into the high-level tank from the low-level tank along the fifth pipe path; the conveying pump outlet recirculation valve 13 is disposed on the fifth pipe path.

The conveying pump 4 is mounted on the low-level tank 2, which functions to send out the molten salt in the low-level tank 2 back to the high-level tank 1 through the fifth pipe path on the one hand and to be conveyed to the outside through the pipelines on the other hand. Since the height and the volume of the low-level tank are much smaller than those of the high-level tank, the equipment cost may be reduced and the system reliability may be improved as compared with using the long-shaft submerged molten salt pump; further, since the mounting height of the low-level tank is lower than that of the high-level tank, the amount of molten salt that may not be used in the high-level tank due to the use of the long-shaft submerged molten salt pump may further be reduced.

When the flow of the molten salt is required to be cut off between the low-level tank 2 and the high-level tank 1, first the rapid flow of the molten salt is cut off by closing the high-low-level tank isolation valve 7, and then the compressed gas is introduced into the temperature regulator 8 from the uninterrupted compressed gas source 3 through the gas source pipeline. During this process, the heater 9 is not in the operation, and the fourth valve assembly 54 adjusts the volume and the flow rate of the gas entering the temperature regulator 8 to cool the molten salt in the connecting pipe between the high-level tank 1 and the low-level tank 2 by convection heat transfer, so that the molten salt in this section of the pipeline is completely solidified and does not flow; and a temperature of the pipeline of the cooled part of the molten salt is adjusted by the gas pressure adjustment valve 10, a degree of openness of the gas pressure adjustment valve 10 is related with the temperature of the temperature sensor 11 mounted on the pipeline of the cooled part of the molten salt, and then the temperature of the temperature sensor 11 is controlled not to exceed a solidification temperature of the molten salt to ensure that the molten salt does not melt.

When the flow of the molten salt is required to be restarted again between the low-level tank 2 and the high-level tank 1, the high-low-level tank isolation valve 7 is opened first, and then the compressed gas is introduced into the temperature regulator 8 from the uninterrupted compressed gas source 3 through the gas source pipeline, wherein the fourth valve assembly adjusts the volume and the flow rate of the gas entering the temperature regulator 8. During this process, the heater 9 starts to be in operation, so that it heats the gas introduced into the temperature regulator 8. The heated gas enters the temperature regulator to heat the molten salt in this section of the pipeline between the high-level tank 1 and the low-level tank 2 by convection heat transfer, so that the molten salt in this section of the pipeline melts and flows.

Embodiment Two

Figure 2:
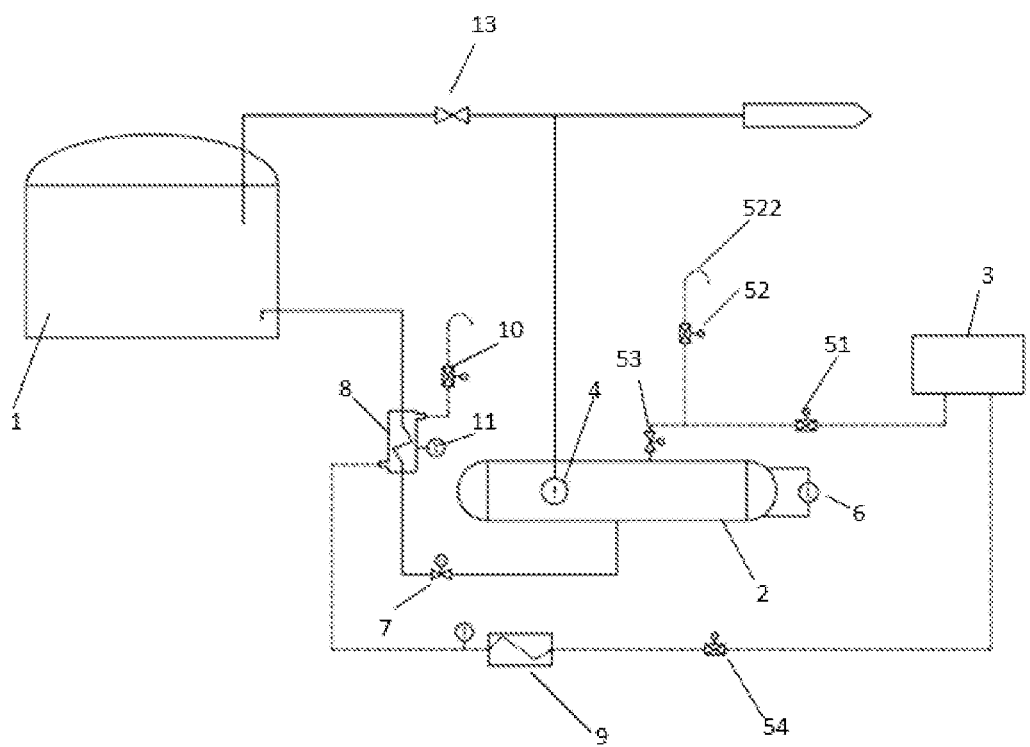
FIG. 2 is a view of a heat-storage medium conveying system for a solar-thermal power plant according to a second embodiment of the invention.

FIG. 2 is a view of Embodiment Two of the invention, which discloses a heat-storage medium conveying system for a solar-thermal power plant including a high-level tank subsystem, the high-level tank subsystem including a high-level tank 1 used to store the heat-storage medium and a heat-storage medium transport subsystem; the high-level tank subsystem is connected with the heat-storage medium transport subsystem.

In the embodiment, the heat-storage medium is a molten salt, which is only an example. The invention will not specifically define the heat-storage medium. The high-level tank is a molten salt storage tank.

The heat-storage medium transport subsystem includes a low-level tank 2 and an uninterrupted compressed gas source 3;

a mounting height of the low-level tank 2 is lower than that of the high-level tank 1; a volume of the low-level tank 2 is smaller than a volume of the high-level tank 1; the heat-storage medium may enter the low-level tank from the high-level tank partially or completely by its own gravity; the low-level tank is provided with a conveying pump 4, and the heat-storage medium is pumped out of the low-level tank through the conveying pump.

the uninterrupted compressed gas source is communicated with a gas-phase space of the low-level tank through a gas source pipeline, and the gas source pipeline forms a first pipe path; the uninterrupted compressed gas source increases a gas pressure in the low-level tank to decrease a liquid level of the heat-storage medium in the low-level tank by inflating the low-level tank.

In the embodiment, the conveying pump is a molten salt pump, and the uninterrupted compressed gas source 3 is a buffer gas storage tank. A gas in the buffer gas storage tank may be an air or gases other than air that do not chemically react with the heat-storage medium such as nitrogen and so on. The invention does not define the specific type of the gas.

The heat-storage medium transport subsystem further includes a first valve assembly 51, a second valve assembly 52 and a third valve assembly 53.

The first valve assembly is used to adjust an inflation volume provided by the uninterrupted compressed gas source for the low-level tank; the first valve assembly 51 is disposed on the first pipe path. When a liquid level of the low-level tank is high, the first valve assembly is opened to prevent the liquid level of the low-level tank from being high.

In the embodiment, the first valve assembly 51 includes only one intake adjustment valve.

The second valve assembly 52 elevates the liquid level of the heat-storage medium in the low-level tank by reducing the gas pressure in the low-level tank; the low-level tank is provided with a first gas exhaust pipeline 522, and the first gas exhaust pipeline forms a second pipe path; the second valve assembly is disposed on the second pipe path. When a liquid level of the low-level tank is low, the second valve assembly is opened to prevent the liquid level of the low-level tank from being low.

In the embodiment, a height of an outlet of the first gas exhaust pipeline 522 is the same as a highest liquid level of the high-level tank 1.

It should be noted that if the uninterrupted compressed gas source 3 provides the air, the outlet of the first gas exhaust pipeline 522 may be directly communicated with the atmosphere. If the uninterrupted compressed gas source 3 provides the gas other than the air, such as the nitrogen, the issue of recovering the relevant gas should be considered, and the outlet of the first gas exhaust pipeline 522 may be connected with a gas recovery apparatus, wherein the gas recovered by the apparatus may be further considered to be back into the uninterrupted compressed gas source 3.

In the embodiment, the second valve assembly 52 includes only one exhaust adjustment valve.

When the first pipe path and the second pipe path share part of the pipeline, the third valve assembly 53 is disposed on the shared pipeline. In the embodiment, the third valve assembly 53 includes a check valve.

The heat-storage medium transport subsystem further includes a low-level tank liquid level sensor 6, a high-low-level tank isolation valve 7, a temperature regulator 8, a heater 9, a gas pressure adjustment valve 10, a temperature sensor 11 and a fourth valve assembly 54.

In the embodiment, the temperature regulator 8 is an air cooler/heater. The heater 9 is an electric heater.

The low-level tank liquid level sensor 6 is mounted on the low-level tank 2 for detecting the liquid level of the heat-storage medium in the low-level tank 2. When the low-level tank liquid level sensor 6 issues a low-level alarm, the second valve assembly 52 is opened to elevate the liquid level of the low-level tank 2 to a normal operating liquid level; when the low-level tank liquid level sensor 6 issues a high-level alarm, the first valve assembly 51 is opened to lower the liquid level of the low-level tank 2 to the normal operating liquid level.

A first pipeline is disposed between the high-level tank 1 and the low-level tank 2, the high-level tank 1 is connected with the low-level tank 2 through the first pipeline, and the first pipeline therebetween forms a third pipe path; the high-low-level tank isolation valve 7 is disposed on the third pipe path. Once the low-level tank 2 fails and needs to be shut down for maintenance, the flow of the heat-storage medium between the high-level tank 1 and the low-level tank 2 is cut off through the high-low-level tank isolation valve 7, and then a compressed air is introduced into the temperature regulator 8 to freeze the heat-storage medium, so as to further completely cut off the flow of the heat-storage medium between the high-level tank 1 and the low-level tank 2.

The uninterrupted compressed gas source 3 is connected with an inlet of the temperature regulator 8 through a pipeline, and the pipeline connecting therebetween forms a fourth pipe path. The heater 9 is located on the fourth pipe path. An outlet of the temperature regulator 8 is connected with a second gas exhaust pipeline, and the gas pressure adjustment valve 10 is disposed on the second gas exhaust pipeline. The temperature sensor 11 is mounted on the temperature regulator 8.

The fourth valve assembly 54 is used to adjust a volume and a flow rate of a gas entering the temperature regulator 8; the fourth valve assembly is disposed on the fourth pipe path and located between the heater 9 and the uninterrupted compressed gas source 3. Meanwhile, the fourth valve assembly 54 is used to control the air pressure in the temperature regulator 8, so that on the one hand the cooling speed may be adjusted; in addition, once the pipeline at the heat-storage medium side in the temperature regulator 8 fails and leaks, the heat-storage medium may also be prevented from leaking by controlling, in the temperature regulator 8, the pressure at the gas side to be higher than the pressure at the heat-storage medium side.

In the embodiment, the fourth valve assembly 54 includes only one air flow adjustment valve.

The heat-storage medium transport subsystem further includes a conveying pump outlet recirculation valve 13, wherein a second pipeline is disposed between the high-level tank and the low-level tank; one end of the second pipeline is connected with an inlet of the high-level tank, and the other end of the second pipeline is connected with an outlet of the conveying pump; the second pipeline forms a fifth pipe path, and the heat-storage medium may be pumped into the high-level tank from the low-level tank along the fifth pipe path; the conveying pump outlet recirculation valve 13 is disposed on the fifth pipe path.

The conveying pump 4 is mounted on the low-level tank 2, which functions to send out the molten salt in the low-level tank 2 back to the high-level tank 1 through the fifth pipe path on the one hand and to be conveyed to the outside through the pipelines on the other hand. Since the height and the volume of the low-level tank are much smaller than those of the high-level tank, the equipment cost may be reduced and the system reliability may be improved as compared with using the long-shaft submerged molten salt pump; further, since the mounting height of the low-level tank is lower than that of the high-level tank, the amount of molten salt that may not be used in the high-level tank due to the use of the long-shaft submerged molten salt pump may further be reduced.

When the flow of the molten salt is required to be cut off between the low-level tank 2 and the high-level tank 1, first the rapid flow of the molten salt is cut off by closing the high-low-level tank isolation valve 7, and then the compressed gas is introduced into the temperature regulator 8 from the uninterrupted compressed gas source 3 through the gas source pipeline. During this process, the heater 9 is not in the operation, and the fourth valve assembly 54 adjusts the volume and the flow rate of the gas entering the temperature regulator 8 to cool the molten salt in the connecting pipe between the high-level tank 1 and the low-level tank 2 by convection heat transfer, so that the molten salt in this section of the pipeline is completely solidified and does not flow; and a temperature of the pipeline of the cooled part of the molten salt is adjusted by the gas pressure adjustment valve 10, a degree of openness of the gas pressure adjustment valve 10 is related with the temperature of the temperature sensor 11 mounted on the pipeline of the cooled part of the molten salt, and then the temperature of the temperature sensor 11 is controlled not to exceed a solidification temperature of the molten salt to ensure that the molten salt does not melt.

When the flow of the molten salt is required to be restarted again between the low-level tank 2 and the high-level tank 1, the high-low-level tank isolation valve 7 is opened first, and then the compressed gas is introduced into the temperature regulator 8 from the uninterrupted compressed gas source 3 through the gas source pipeline, wherein the fourth valve assembly adjusts the volume and the flow rate of the gas entering the temperature regulator 8. During this process, the heater 9 starts to be in operation, so that it heats the gas introduced into the temperature regulator 8. The heated gas enters the temperature regulator to heat the molten salt in this section of the pipeline between the high-level tank 1 and the low-level tank 2 by convection heat transfer, so that the molten salt in this section of the pipeline melts and flows.

Embodiment Second differs from Embodiment First in that:

the first valve assembly includes only one intake adjustment valve; the second valve assembly includes only one exhaust adjustment valve; the fourth valve assembly includes only one air flow adjustment valve; the flexible connector is disposed on the third pipe path.

Embodiment Three

Figure 3:
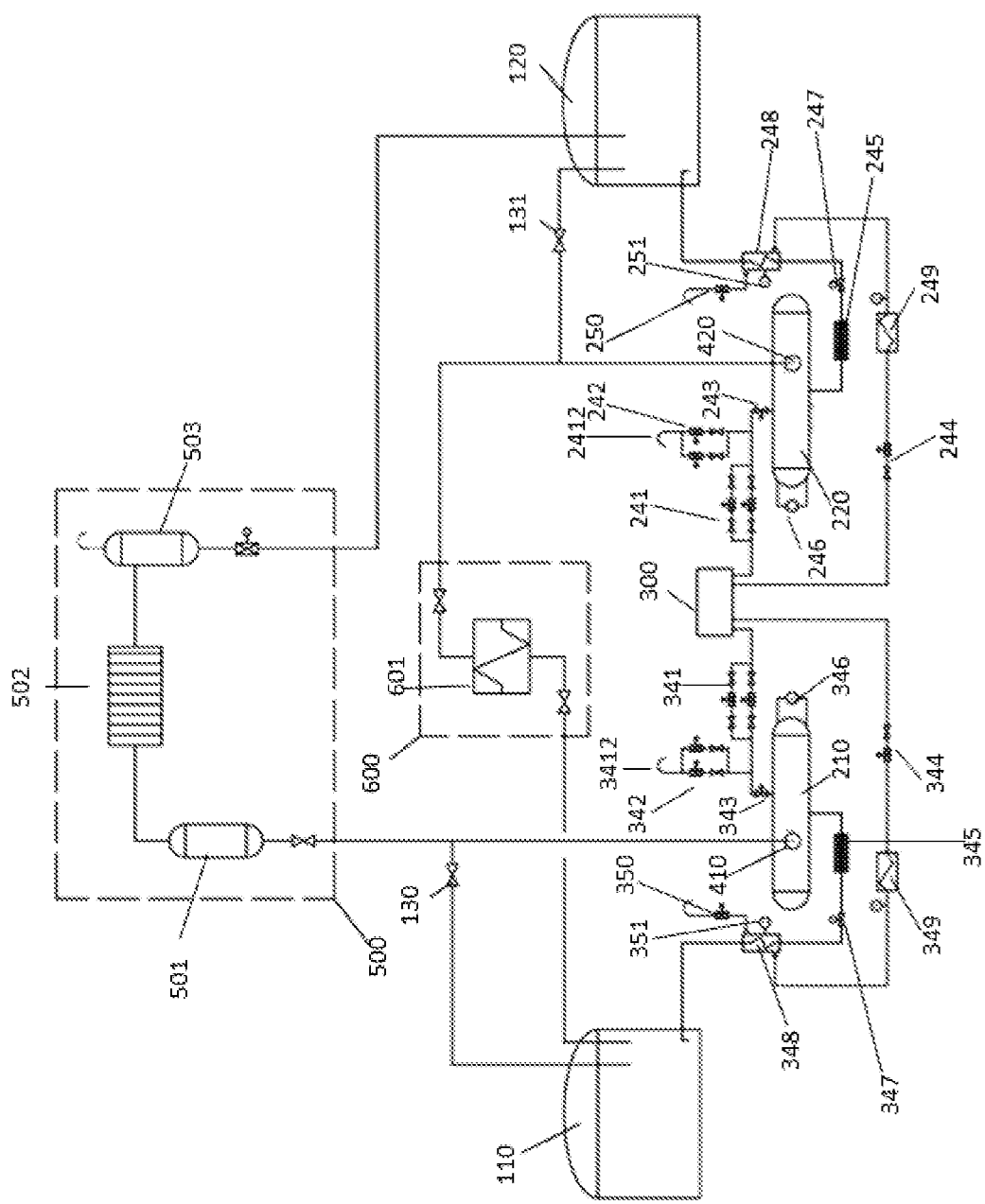
FIG. 3 is a view of a heat-storage medium conveying system for a solar-thermal power plant according to a third embodiment of the invention.

As shown in FIG. 3, Embodiment Three of the invention discloses a heat-storage medium conveying system for a solar-thermal power plant including a high-level tank subsystem, a heat-storage medium heat absorption subsystem 500, a heat-storage medium heat exchange subsystem 600 and a heat-storage medium transport subsystem.

The high-level tank subsystem includes a high-temperature heat-storage medium high-level tank 120 used to store a high-temperature heat-storage medium and/or a low-temperature heat-storage medium high-level tank 110 used to store a low-temperature heat-storage medium. The heat-storage medium transport subsystem includes a high-temperature heat-storage medium transport subsystem and/or a low-temperature heat-storage medium transport subsystem; the high-level tank subsystem is connected with the heat-storage medium transport subsystem.

In the embodiment, the high-level tank subsystem includes a high-temperature heat-storage medium high-level tank 120 used to store a high-temperature heat-storage medium and a low-temperature heat-storage medium high-level tank 110 used to store a low-temperature heat-storage medium. The heat-storage medium transport subsystem includes a high-temperature heat-storage medium transport subsystem and a low-temperature heat-storage medium transport subsystem.

It should be noted that in actual implementation, the high-level tank subsystem may only include the high-temperature heat-storage medium high-level tank or a low-temperature heat-storage medium high-level tank, and correspondingly the heat-storage medium transport subsystem may only include the high-temperature heat-storage medium transport subsystem or the low-temperature heat-storage medium transport subsystem. In other words, the conveying system of the invention is used only for conveying the high-temperature heat-storage medium, or the conveying system of the invention is used only for conveying the low-temperature heat-storage medium. The invention does not define the above content.

The high-temperature heat-storage medium transport subsystem is disposed corresponding to the high-temperature heat-storage medium high-level tank 120; the high-temperature heat-storage medium transport subsystem comprises a high-temperature heat-storage medium low-level tank 220.

A mounting height of the high-temperature heat-storage medium low-level tank 220 is lower than that of the high-temperature heat-storage medium high-level tank 120; a volume of the high-temperature heat-storage medium low-level tank 220 is smaller than a volume of the high-temperature heat-storage medium high-level tank 120; the high-temperature heat-storage medium may enter the high-temperature heat-storage medium low-level tank 220 from the high-temperature heat-storage medium high-level tank 120 partially or completely by its own gravity; the high-temperature heat-storage medium low-level tank 220 is provided with a high-temperature heat-storage medium conveying pump 420.

An outlet of the high-temperature heat-storage medium conveying pump 420 is connected with the heat-storage medium heat exchange subsystem 600 and the high-temperature heat-storage medium high-level tank 120 respectively; the high-temperature heat-storage medium is pumped into the heat-storage medium heat exchange subsystem 600 from the high-temperature heat-storage medium low-level tank 220.

The low-temperature heat-storage medium transport subsystem is disposed corresponding to the low-temperature heat-storage medium high-level tank 110; the low-temperature heat-storage medium transport subsystem includes a low-temperature heat-storage medium low-level tank 210; a mounting height of the low-temperature heat-storage medium low-level tank 210 is lower than that of the low-temperature heat-storage medium high-level tank 110; a volume of the low-temperature heat-storage medium low-level tank 210 is smaller than a volume of the low-temperature heat-storage medium high-level tank 110; the low-temperature heat-storage medium may enter the low-temperature heat-storage medium low-level tank 210 from the low-temperature heat-storage medium high-level tank 110 partially or completely by its own gravity; the low-temperature heat-storage medium low-level tank 210 is provided with a low-temperature heat-storage medium conveying pump 410; an outlet of the low-temperature heat-storage medium conveying pump 410 is connected with the heat-storage medium heat absorption subsystem 500 and the low-temperature heat-storage medium high-level tank 110 respectively; the low-temperature heat-storage medium is pumped into the heat-storage medium heat absorption subsystem 500 from the low-temperature heat-storage medium low-level tank 210.

The high-temperature heat-storage medium transport subsystem further includes an uninterrupted compressed gas source 300. In the embodiment, the high-temperature heat-storage medium is a high-temperature molten salt, the high-temperature heat-storage medium conveying pump 420 is a molten salt pump, and the uninterrupted compressed gas source 300 is a buffer gas storage tank. A gas in the buffer gas storage tank may be an air or gases other than air that do not chemically react with the molten salt, such as nitrogen and so on. The invention does not define the specific type of the gas.

The uninterrupted compressed gas source 300 is communicated with a gas-phase space of the high-temperature heat-storage medium low-level tank 220 through a gas source pipeline, and the gas source pipeline forms a high-temperature heat-storage medium first pipe path; the uninterrupted compressed gas source 300 increases a gas pressure in the high-temperature heat-storage medium low-level tank 220 to decrease a liquid level of the heat-storage medium in the high-temperature heat-storage medium low-level tank 220 by inflating the high-temperature heat-storage medium low-level tank 220.

The high-temperature heat-storage medium transport subsystem further includes a high-temperature heat-storage medium first valve assembly 241, a high-temperature heat-storage medium second valve assembly 242 and a high-temperature heat-storage medium third valve assembly 243.

The high-temperature heat-storage medium first valve assembly 241 is used to adjust an inflation volume provided by the uninterrupted compressed gas source for the high-temperature heat-storage medium low-level tank 220; the high-temperature heat-storage medium first valve assembly 241 is disposed on the high-temperature heat-storage medium first pipe path. When the liquid level of the high-temperature heat-storage medium low-level tank 220 is high, the high-temperature heat-storage medium first valve assembly 241 is opened to prevent the liquid level of the high-temperature heat-storage medium 220 from being too high.

In the embodiment, the high-temperature heat-storage medium first valve assembly 241 includes two valve groups connected in parallel; each of the valve groups comprises three valves connected in series, i.e., two check valves and an intake adjustment valve disposed between the two check valves.

The high-temperature heat-storage medium second valve assembly 242 elevates the liquid level of the heat-storage medium in the high-temperature heat-storage medium low-level tank 220 by reducing the gas pressure in the high-temperature heat-storage medium low-level tank; the high-temperature heat-storage medium low-level tank 220 is provided with a high-temperature heat-storage medium first gas exhaust pipeline 2412, and the high-temperature heat-storage medium first gas exhaust pipeline 2412 forms a high-temperature heat-storage medium second pipe path; the high-temperature heat-storage medium second valve assembly 242 is disposed on the high-temperature heat-storage medium second pipe path. When the liquid level of the high-temperature heat-storage medium low-level tank 220 is low, the high-temperature heat-storage medium second valve assembly 242 is opened to prevent the liquid level of the high-temperature heat-storage medium 220 from being too low. In the embodiment, a height of an outlet of the high-temperature heat-storage medium first gas exhaust pipeline 2412 is the same as a highest liquid level of the high-temperature heat-storage medium high-level tank 120.

It should be noted that if the uninterrupted compressed gas source 300 provides the air, the outlet of the first gas exhaust pipeline may be directly communicated with the atmosphere. If the uninterrupted compressed gas source 300 provides the gas other than the air, such as the nitrogen, the issue of recovering the relevant gas should be considered, and the outlet of the high-temperature heat-storage medium first gas exhaust pipeline 2412 may be connected with a gas recovery apparatus, wherein the gas recovered by the apparatus may be further considered to be back into the uninterrupted compressed gas source 300.

In the embodiment, the high-temperature heat-storage medium second valve assembly 242 includes two valve groups connected in parallel; each of the valve groups comprises two valves connected in series, i.e., an exhaust adjustment valve and a check valve.

When the high-temperature heat-storage medium first pipe path and the high-temperature heat-storage medium second pipe path share part of the pipeline, the high-temperature heat-storage medium third valve assembly 243 is disposed on the shared pipeline. In the embodiment, the high-temperature heat-storage medium third valve assembly 243 includes a check valve.

The high-temperature heat-storage medium transport subsystem further includes a high-temperature heat-storage medium low-level tank liquid level sensor 246, a high-temperature heat-storage medium high-low-level tank isolation valve 247, a high-temperature heat-storage medium temperature regulator 248, a high-temperature heat-storage medium heater 249, a high-temperature heat-storage medium gas pressure adjustment valve 250, a high-temperature heat-storage medium temperature sensor 251, a high-temperature heat-storage medium fourth valve assembly 244 and a high-temperature heat-storage medium flexible connector 245.

In the embodiment, the high-temperature heat-storage medium temperature regulator 248 is an air cooler/heater. The high-temperature heat-storage medium heater 249 is an electric heater.

The high-temperature heat-storage medium low-level tank liquid level sensor 246 is mounted on the high-temperature heat-storage medium low-level tank 220 for detecting the liquid level of the heat-storage medium in the high-temperature heat-storage medium low-level tank 220. When the high-temperature heat-storage medium low-level tank liquid level sensor 246 issues a low-level alarm, the high-temperature heat-storage medium second valve assembly 242 is opened to elevate the liquid level of the high-temperature heat-storage medium low-level tank 220 to a normal operating liquid level; when the high-temperature heat-storage medium low-level tank liquid level sensor 246 issues a high-level alarm, the high-temperature heat-storage medium first valve assembly 241 is opened to lower the liquid level of the high-temperature heat-storage medium low-level tank 220 to the normal operating liquid level.

A high-temperature heat-storage medium first pipeline is disposed between the high-temperature heat-storage medium high-level tank 120 and the high-temperature heat-storage medium low-level tank 220, the high-temperature heat-storage medium high-level tank 120 is connected with the high-temperature heat-storage medium low-level tank 220 through the high-temperature heat-storage medium first pipeline, and the high-temperature heat-storage medium first pipeline therebetween forms a high-temperature heat-storage medium third pipe path; the high-temperature heat-storage medium high-low-level tank isolation valve 247 is disposed on the high-temperature heat-storage medium third pipe path. Once the high-temperature heat-storage medium low-level tank 220 fails and needs to be shut down for maintenance, the flow of the heat-storage medium between the high-temperature heat-storage medium high-level tank 120 and the high-temperature heat-storage medium low-level tank 220 is cut off through the high-temperature heat-storage medium high-low-level tank isolation valve 247, and then a compressed air is introduced into the high-temperature heat-storage medium temperature regulator 248 to freeze the heat-storage medium, so as to further completely cut off the flow of the heat-storage medium between the high-temperature heat-storage medium high-level tank 120 and the high-temperature heat-storage medium low-level tank 220.

The uninterrupted compressed gas source 300 is connected with an inlet of the high-temperature heat-storage medium temperature regulator 248 through a pipeline, and the pipeline connecting therebetween forms a high-temperature heat-storage medium fourth pipe path. The high-temperature heat-storage medium heater 249 is located on the high-temperature heat-storage medium fourth pipe path. An outlet of the high-temperature heat-storage medium temperature regulator 248 is connected with a high-temperature heat-storage medium second gas exhaust pipeline, and the high-temperature heat-storage medium gas pressure adjustment valve 250 is disposed on the high-temperature heat-storage medium second gas exhaust pipeline. The high-temperature heat-storage medium temperature sensor 251 is mounted on the high-temperature heat-storage medium temperature regulator 248.

The high-temperature heat-storage medium fourth valve assembly 244 is used to adjust a volume and a flow rate of a gas entering the high-temperature heat-storage medium temperature regulator 248; the high-temperature heat-storage medium fourth valve assembly 244 is disposed on the high-temperature heat-storage medium fourth pipe path and located between the high-temperature heat-storage medium heater 249 and the uninterrupted compressed gas source 300. Meanwhile, the high-temperature heat-storage medium fourth valve assembly 244 is used to control the air pressure in the high-temperature heat-storage medium temperature regulator 248, so that on the one hand the cooling speed may be adjusted; in addition, once the pipeline at the heat-storage medium side in the high-temperature heat-storage medium temperature regulator 248 fails and leaks, the heat-storage medium may also be prevented from leaking by controlling the pressure at the gas side to be higher than the pressure at the heat-storage medium side.

In the embodiment, the high-temperature heat-storage medium fourth valve assembly 244 includes an adjustment valve and a check valve.

The high-temperature heat-storage medium flexible connector 245 is disposed on the high-temperature heat-storage medium third pipe path, and located between the high-temperature heat-storage medium low-level tank 220 and the high-temperature heat-storage medium high-low-level tank isolation valve 247. The high-temperature heat-storage medium flexible connector 245 may be a bellows, which functions to realize the flexible connection of the high-temperature heat-storage medium high-level tank 120 and the high-temperature heat-storage medium low-level tank 220, and reduces the thermal stress between the high-temperature heat-storage medium high-level tank 120 and the high-temperature heat-storage medium low-level tank 220 when the high-temperature heat-storage medium high-level tank 120 expands and contracts due to temperature changes.

The high-temperature heat-storage medium transport subsystem further includes a high-temperature heat-storage medium conveying pump outlet recirculation valve 131, wherein A high-temperature heat-storage medium second pipeline is disposed between the high-temperature heat-storage medium high-level tank 120 and the high-temperature heat-storage medium low-level tank 220; one end of the high-temperature heat-storage medium second pipeline is connected with an inlet of the high-temperature heat-storage medium high-level tank 120, and the other end of the high-temperature heat-storage medium second pipeline is connected with an outlet of the high-temperature heat-storage medium conveying pump 420; the high-temperature heat-storage medium second pipeline forms a high-temperature heat-storage medium fifth pipe path, and the heat-storage medium may be pumped into the high-temperature heat-storage medium high-level tank 120 from the high-temperature heat-storage medium low-level tank 220 along the high-temperature heat-storage medium fifth pipe path; the high-temperature heat-storage medium conveying pump outlet recirculation valve 131 is disposed on the high-temperature heat-storage medium fifth pipe path.

The high-temperature heat-storage medium conveying pump 420 is mounted on the high-temperature heat-storage medium low-level tank 220, which functions to send out the molten salt in the high-temperature heat-storage medium low-level tank 220 back to the high-temperature heat-storage medium high-level tank 120 through the high-temperature heat-storage medium fifth pipe path on the one hand and to be conveyed to the heat-storage medium heat exchange subsystem 600 through the pipelines on the other hand. Since the height and the volume of the high-temperature heat-storage medium low-level tank 220 are much smaller than those of the high-temperature heat-storage medium high-level tank 120, the equipment cost may be reduced and the system reliability may be improved as compared with using the long-shaft submerged molten salt pump; further, since the mounting height of the high-temperature heat-storage medium low-level tank 220 is lower than that of the high-temperature heat-storage medium high-level tank 120, the amount of molten salt that may not be used in the high-temperature heat-storage medium high-level tank 120 due to the use of the long-shaft submerged molten salt pump may further be reduced.

When the flow of the molten salt is required to be cut off between the high-temperature heat-storage medium low-level tank 220 and the high-temperature heat-storage medium high-level tank 120, first the rapid flow of the molten salt is cut off by closing the high-temperature heat-storage medium high-low-level tank isolation valve 247, and then the compressed gas is introduced into the high-temperature heat-storage medium temperature regulator 248 from the uninterrupted compressed gas source 300 through the gas source pipeline. During this process, the high-temperature heat-storage medium heater 249 is not in the operation, and the high-temperature heat-storage medium fourth valve assembly 244 adjusts the volume and the flow rate of the gas entering the high-temperature heat-storage medium temperature regulator 248 to cool the molten salt in the connecting pipe between the high-temperature heat-storage medium high-level tank 120 and the high-temperature heat-storage medium low-level tank 220 by convection heat transfer, so that the molten salt in this section of the pipeline is completely solidified and does not flow; and a temperature of the pipeline of the cooled part of the molten salt is adjusted by the high-temperature heat-storage medium gas pressure adjustment valve 250, a degree of openness of the high-temperature heat-storage medium gas pressure adjustment valve 250 is related with the temperature of the high-temperature heat-storage medium temperature sensor 251 mounted on the pipeline of the cooled part of the molten salt, and then the temperature of the high-temperature heat-storage medium temperature sensor 251 is controlled not to exceed a solidification temperature of the molten salt to ensure that the molten salt does not melt.

When the flow of the molten salt is required to be restarted again between the high-temperature heat-storage medium low-level tank 220 and the high-temperature heat-storage medium high-level tank 210, the high-temperature heat-storage medium high-low-level tank isolation valve 247 is opened first, and then the compressed gas is introduced into the high-temperature heat-storage medium temperature regulator 248 from the uninterrupted compressed gas source 300 through the gas source pipeline, wherein the high-temperature heat-storage medium fourth valve assembly 244 adjusts the volume and the flow rate of the gas entering the high-temperature heat-storage medium temperature regulator 248. During this process, the high-temperature heat-storage medium heater 249 starts to be in operation, so that it heats the gas introduced into the high-temperature heat-storage medium temperature regulator 248. The heated gas enters the high-temperature heat-storage medium temperature regulator 248 to heat the molten salt in this section of the pipeline between the high-temperature heat-storage medium high-level tank 120 and the high-temperature heat-storage medium low-level tank 220 by convection heat transfer, so that the molten salt in this section of the pipeline melts and flows.

The low-temperature heat-storage medium transport subsystem further includes an uninterrupted compressed gas source 300, and shares the uninterrupted compressed gas source 300 with the high-temperature heat-storage medium transport subsystem. In the embodiment, the low-temperature heat-storage medium is a low-temperature molten salt, the low-temperature heat-storage medium conveying pump 410 is a molten salt pump, and the uninterrupted compressed gas source 300 is a buffer gas storage tank. A gas in the buffer gas storage tank may be an air or gases other than air, such as nitrogen and so on. The invention does not define the specific type of the gas.

The uninterrupted compressed gas source 300 is communicated with a gas-phase space of the low-temperature heat-storage medium low-level tank 210 through a gas source pipeline, and the gas source pipeline forms a low-temperature heat-storage medium first pipe path; the uninterrupted compressed gas source 300 increases a gas pressure in the low-temperature heat-storage medium low-level tank 210 to decrease a liquid level of the heat-storage medium in the low-temperature heat-storage medium low-level tank 210 by inflating the low-temperature heat-storage medium low-level tank 210.

The low-temperature heat-storage medium transport subsystem further includes a low-temperature heat-storage medium first valve assembly 341, a low-temperature heat-storage medium second valve assembly 342 and a low-temperature heat-storage medium third valve assembly 343.

The low-temperature heat-storage medium first valve assembly 341 is used to adjust an inflation volume provided by the uninterrupted compressed gas source for the low-temperature heat-storage medium low-level tank 210; the low-temperature heat-storage medium first valve assembly 341 is disposed on the low-temperature heat-storage medium first pipe path. When the liquid level of the low-temperature heat-storage medium low-level tank 210 is high, the low-temperature heat-storage medium first valve assembly 341 is opened to prevent the liquid level of the low-temperature heat-storage medium 210 from being too high.

In the embodiment, the low-temperature heat-storage medium first valve assembly 341 includes two valve groups connected in parallel; each of the valve groups comprises three valves connected in series, i.e., two check valves and an intake adjustment valve disposed between the two check valves.

The low-temperature heat-storage medium second valve assembly 342 elevates the liquid level of the heat-storage medium in the low-temperature heat-storage medium low-level tank 210 by reducing the gas pressure in the low-temperature heat-storage medium low-level tank 210; the low-temperature heat-storage medium low-level tank 210 is provided with a low-temperature heat-storage medium first gas exhaust pipeline 3412, and the low-temperature heat-storage medium first gas exhaust pipeline 3412 forms a low-temperature heat-storage medium second pipe path; the low-temperature heat-storage medium second valve assembly 342 is disposed on the low-temperature heat-storage medium second pipe path. When the liquid level of the low-temperature heat-storage medium low-level tank 210 is low, the low-temperature heat-storage medium second valve assembly 342 is opened to prevent the liquid level of the low-temperature heat-storage medium 210 from being too low. In the embodiment, a height of an outlet of the low-temperature heat-storage medium first gas exhaust pipeline 3412 is the same as a highest liquid level of the low-temperature heat-storage medium high-level tank 110.

It should be noted that if the uninterrupted compressed gas source 300 provides the air, the outlet of the first gas exhaust pipeline may be directly communicated with the atmosphere. If the uninterrupted compressed gas source 300 provides the gas other than the air, such as the nitrogen, the issue of recovering the relevant gas should be considered, and the outlet of the low-temperature heat-storage medium first gas exhaust pipeline 3412 may be connected with a gas recovery apparatus, wherein the gas recovered by the apparatus may be further considered to be back into the uninterrupted compressed gas source 300.

In the embodiment, the low-temperature heat-storage medium second valve assembly 342 includes two valve groups connected in parallel; each of the valve groups includes two valves connected in series, i.e., an exhaust adjustment valve and a check valve.

When the low-temperature heat-storage medium first pipe path and the low-temperature heat-storage medium second pipe path share part of the pipeline, the low-temperature heat-storage medium third valve assembly 343 is disposed on the shared pipeline. In the embodiment, the low-temperature heat-storage medium third valve assembly 343 includes a check valve.

The low-temperature heat-storage medium transport subsystem further includes a low-temperature heat-storage medium low-level tank liquid level sensor 346, a low-temperature heat-storage medium high-low-level tank isolation valve 347, a low-temperature heat-storage medium temperature regulator 348, a low-temperature heat-storage medium heater 349, a low-temperature heat-storage medium gas pressure adjustment valve 350, a low-temperature heat-storage medium temperature sensor 351, a low-temperature heat-storage medium fourth valve assembly 344 and a low-temperature heat-storage medium flexible connector 345.

In the embodiment, the low-temperature heat-storage medium temperature regulator 348 is an air cooler/heater. The low-temperature heat-storage medium heater 349 is an electric heater.

The low-temperature heat-storage medium low-level tank liquid level sensor 346 is mounted on the low-temperature heat-storage medium low-level tank 210 for detecting the liquid level of the heat-storage medium in the low-temperature heat-storage medium low-level tank 210. When the low-temperature heat-storage medium low-level tank liquid level sensor 346 issues a low-level alarm, the low-temperature heat-storage medium second valve assembly 342 is opened to elevate the liquid level of the low-temperature heat-storage medium low-level tank 210 to a normal operating liquid level; when the low-temperature heat-storage medium low-level tank liquid level sensor 346 issues a high-level alarm, the low-temperature heat-storage medium first valve assembly 341 is opened to lower the liquid level of the low-temperature heat-storage medium low-level tank 210 to the normal operating liquid level.

A low-temperature heat-storage medium first pipeline is disposed between the low-temperature heat-storage medium high-level tank 110 and the low-temperature heat-storage medium low-level tank 210, the low-temperature heat-storage medium high-level tank 110 is connected with the low-temperature heat-storage medium low-level tank 210 through the low-temperature heat-storage medium first pipeline, and the low-temperature heat-storage medium first pipeline therebetween forms a low-temperature heat-storage medium third pipe path; the low-temperature heat-storage medium high-low-level tank isolation valve 347 is disposed on the low-temperature heat-storage medium third pipe path. Once the low-temperature heat-storage medium low-level tank 210 fails and needs to be shut down for maintenance, the flow of the heat-storage medium between the low-temperature heat-storage medium high-level tank 110 and the low-temperature heat-storage medium low-level tank 210 is cut off through the low-temperature heat-storage medium high-low-level tank isolation valve 347, and then a compressed air is introduced into the low-temperature heat-storage medium temperature regulator 348 to freeze the heat-storage medium, so as to further completely cut off the flow of the heat-storage medium between the low-temperature heat-storage medium high-level tank 110 and the low-temperature heat-storage medium low-level tank 210.

The uninterrupted compressed gas source 300 is connected with an inlet of the low-temperature heat-storage medium temperature regulator 348 through a pipeline, and the pipeline connecting therebetween forms a low-temperature heat-storage medium fourth pipe path. The low-temperature heat-storage medium heater 349 is located on the low-temperature heat-storage medium fourth pipe path. An outlet of the low-temperature heat-storage medium temperature regulator 348 is connected with a low-temperature heat-storage medium second gas exhaust pipeline, and the low-temperature heat-storage medium gas pressure adjustment valve 350 is disposed on the low-temperature heat-storage medium second gas exhaust pipeline. The low-temperature heat-storage medium temperature sensor 351 is mounted on the low-temperature heat-storage medium temperature regulator 348.

The low-temperature heat-storage medium fourth valve assembly 344 is used to adjust a volume and a flow rate of a gas entering the low-temperature heat-storage medium temperature regulator 348; the low-temperature heat-storage medium fourth valve assembly 344 is disposed on the low-temperature heat-storage medium fourth pipe path and located between the low-temperature heat-storage medium heater 349 and the uninterrupted compressed gas source 300. Meanwhile, the low-temperature heat-storage medium fourth valve assembly 344 is used to control the air pressure in the low-temperature heat-storage medium temperature regulator 348, so that on the one hand the cooling speed may be adjusted; in addition, once the pipeline at the heat-storage medium side in the low-temperature heat-storage medium temperature regulator 348 fails and leaks, the heat-storage medium may also be prevented from leaking by controlling the pressure at the gas side to be higher than the pressure at the heat-storage medium side.

In the embodiment, the low-temperature heat-storage medium fourth valve assembly 344 includes an adjustment valve and a check valve.

The low-temperature heat-storage medium flexible connector 345 is disposed on the low-temperature heat-storage medium third pipe path, and located between the low-temperature heat-storage medium low-level tank 210 and the low-temperature heat-storage medium high-low-level tank isolation valve 347. The low-temperature heat-storage medium flexible connector 345 may be a bellows, which functions to realize the flexible connection of the low-temperature heat-storage medium high-level tank 110 and the low-temperature heat-storage medium low-level tank 210, and reduces the thermal stress between the low-temperature heat-storage medium high-level tank 110 and the low-temperature heat-storage medium low-level tank 210 when the low-temperature heat-storage medium high-level tank 110 expands and contracts due to temperature changes.

The low-temperature heat-storage medium transport subsystem further includes a low-temperature heat-storage medium conveying pump outlet recirculation valve 130, wherein A low-temperature heat-storage medium second pipeline is disposed between the low-temperature heat-storage medium high-level tank 110 and the low-temperature heat-storage medium low-level tank 210; one end of the low-temperature heat-storage medium second pipeline is connected with an inlet of the low-temperature heat-storage medium high-level tank 110, and the other end of the low-temperature heat-storage medium second pipeline is connected with an outlet of the low-temperature heat-storage medium conveying pump 410; the low-temperature heat-storage medium second pipeline forms a low-temperature heat-storage medium fifth pipe path, and the heat-storage medium may be pumped into the low-temperature heat-storage medium high-level tank 110 from the low-temperature heat-storage medium low-level tank 210 along the low-temperature heat-storage medium fifth pipe path; the low-temperature heat-storage medium conveying pump outlet recirculation valve 130 is disposed on the low-temperature heat-storage medium fifth pipe path.

The low-temperature heat-storage medium conveying pump 410 is mounted on the low-temperature heat-storage medium low-level tank 210, which functions to send out the molten salt in the low-temperature heat-storage medium low-level tank 210 back to the low-temperature heat-storage medium high-level tank 110 through the low-temperature heat-storage medium fifth pipe path on the one hand and to be conveyed to the heat-storage medium heat absorption subsystem 500 through the pipelines on the other hand. Since the height and the volume of the low-temperature heat-storage medium low-level tank 210 are much smaller than those of the low-temperature heat-storage medium high-level tank 110, the equipment cost may be reduced and the system reliability may be improved as compared with using the long-shaft submerged molten salt pump; further, since the mounting height of the low-temperature heat-storage medium low-level tank 210 is lower than that of the low-temperature heat-storage medium high-level tank 110, the amount of molten salt that may not be used in the low-temperature heat-storage medium high-level tank 110 due to the use of the long-shaft submerged molten salt pump may further be reduced.

When the flow of the molten salt is required to be cut off between the low-temperature heat-storage medium low-level tank 210 and the low-temperature heat-storage medium high-level tank 110, first the rapid flow of the molten salt is cut off by closing the low-temperature heat-storage medium high-low-level tank isolation valve 347, and then the compressed gas is introduced into the low-temperature heat-storage medium temperature regulator 348 from the uninterrupted compressed gas source 300 through the gas source pipeline. During this process, the low-temperature heat-storage medium heater 349 is not in the operation, and the low-temperature heat-storage medium fourth valve assembly 344 adjusts the volume and the flow rate of the gas entering the low-temperature heat-storage medium temperature regulator 348 to cool the molten salt in the connecting pipe between the low-temperature heat-storage medium high-level tank 110 and the low-temperature heat-storage medium low-level tank 210 by convection heat transfer, so that the molten salt in this section of the pipeline is completely solidified and does not flow; and a temperature of the pipeline of the cooled part of the molten salt is adjusted by the low-temperature heat-storage medium gas pressure adjustment valve 350, a degree of openness of the low-temperature heat-storage medium gas pressure adjustment valve 350 is related with the temperature of the low-temperature heat-storage medium temperature sensor 351 mounted on the pipeline of the cooled part of the molten salt, and then the temperature of the low-temperature heat-storage medium temperature sensor 351 is controlled not to exceed a solidification temperature of the molten salt to ensure that the molten salt does not melt.

When the flow of the molten salt is required to be restarted again between the low-temperature heat-storage medium low-level tank 210 and the low-temperature heat-storage medium high-level tank 110, the low-temperature heat-storage medium high-low-level tank isolation valve 347 is opened first, and then the compressed gas is introduced into the low-temperature heat-storage medium temperature regulator 348 from the uninterrupted compressed gas source 300 through the gas source pipeline, wherein the low-temperature heat-storage medium fourth valve assembly 344 adjusts the volume and the flow rate of the gas entering the low-temperature heat-storage medium temperature regulator 348. During this process, the low-temperature heat-storage medium heater 349 starts to be in operation, so that it heats the gas introduced into the low-temperature heat-storage medium temperature regulator 348. The heated gas enters the low-temperature heat-storage medium temperature regulator 348 to heat the molten salt in this section of the pipeline between the low-temperature heat-storage medium high-level tank 110 and the low-temperature heat-storage medium low-level tank 210 by convection heat transfer, so that the molten salt in this section of the pipeline melts and flows.

The heat-storage medium heat exchange subsystem 600 includes a heater 601, which is connected with the low-temperature heat-storage medium high-level tank 110 and the high-temperature heat-storage medium transport subsystem, respectively through the pipelines, and all of the connecting pipelines on two ends of the heater are provided with valves.

The heat-storage medium heat absorption subsystem 500 includes a heat absorber 502, a heat absorber inlet buffer tank 501 and a heat absorber outlet buffer tank 503; the heat absorber 502 is connected with the heat absorber inlet buffer tank 501 and the heat absorber outlet buffer tank 503 respectively; the heat absorber inlet buffer tank 501 is connected with the low-temperature heat-storage medium transport subsystem, and a valve is disposed on a pipeline connecting therebetween; the heat absorber outlet buffer tank 503 is connected with the high-temperature heat-storage medium high-level tank 120, and a valve is disposed on a pipeline connecting therebetween.

The particular examples of the present invention are described as above. It may be understood that the present invention is not limited to the above particular examples, and various changes or modifications may be made by those skilled in the art within the scope of claims, which does not influence the substantial content of the present invention. The embodiments of the application and the features in the embodiments can be combined with each other arbitrarily if there is no conflict.

What is claimed is:

1. A heat-storage-medium conveying system for a solar-thermal power plant, comprising a high-level tank subsystem, the high-level tank subsystem comprising a high-level tank used to store the heat-storage-medium, wherein the system further comprises a heat-storage-medium transport subsystem;

the high-level tank subsystem is connected with the heat-storage-medium transport subsystem;

the heat-storage-medium transport subsystem comprises a low-level tank; a mounting height of the low-level tank is lower than that of the high-level tank; a volume of the low-level tank is smaller than a volume of the high-level tank; the heat-storage-medium may enter the low-level tank from the high-level tank partially or completely by its own gravity; the low-level tank is provided with a conveying pump, and the heat-storage-medium is pumped out of the low-level tank through the conveying pump; and wherein the heat-storage-medium transport subsystem further comprises an uninterrupted compressed gas source;

the uninterrupted compressed gas source is communicated with a gas-phase space of the low-level tank through a gas source pipeline, and the gas source pipeline forms a first pipe path;

the uninterrupted compressed gas source increases a gas pressure in the low-level tank to decrease a liquid level of the heat-storage-medium in the low-level tank by inflating the low-level tank.

2. The system according to claim 1, wherein the heat-storage-medium transport subsystem further comprises a first valve assembly;

the first valve assembly is used to adjust an inflation volume provided by the uninterrupted compressed gas source for the low-level tank;

the first valve assembly is disposed on the first pipe path.

3. The system according to claim 2, wherein the first valve assembly comprises two valve groups connected in parallel; each of the valve groups comprises three valves connected in series, i.e., two check valves and an intake adjustment valve disposed between the two check valves.

4. The system according to claim 2, wherein the heat-storage-medium transport subsystem further comprises a second valve assembly;

the second valve assembly elevates the liquid level of the heat-storage-medium in the low-level tank by reducing the gas pressure in the low-level tank;

the low-level tank is provided with a first gas exhaust pipeline, and the first gas exhaust pipeline forms a second pipe path;

the second valve assembly is disposed on the second pipe path.

5. The system according to claim 4, wherein the second valve assembly comprises two valve groups connected in parallel; each of the valve groups comprises two valves connected in series, i.e., an exhaust adjustment valve and a check valve.

6. The system according to claim 1, wherein the heat-storage-medium transport subsystem further comprises a low-level tank liquid level sensor;

the low-level tank liquid level sensor is mounted on the low-level tank for detecting the liquid level of the heat-storage-medium in the low-level tank.

7. The system according to claim 1, wherein the heat-storage-medium transport subsystem further comprises a high-low-level tank isolation valve;

a first pipeline is disposed between the high-level tank and the low-level tank, the high-level tank is connected with the low-level tank through the first pipeline, and the first pipeline therebetween forms a third pipe path; the high-low-level tank isolation valve is disposed on the third pipe path.

8. The system according to claim 1, wherein the heat-storage-medium transport subsystem further comprises a temperature regulator;

the uninterrupted compressed gas source is connected with an inlet of the temperature regulator through a pipeline, and the pipeline connecting therebetween forms a fourth pipe path.

9. The system according to claim 8, wherein the heat-storage-medium transport subsystem further comprises a heater; the heater is located on the fourth pipe path.

10. The system according to claim 8, wherein the heat-storage-medium transport subsystem further comprises a gas pressure adjustment valve;

an outlet of the temperature regulator is connected with a second gas exhaust pipeline, and the gas pressure adjustment valve is disposed on the second gas exhaust pipeline.

11. The system according to claim 8, wherein the heat-storage-medium transport subsystem further comprises a temperature sensor; the temperature sensor is mounted on the temperature regulator.

12. The system according to claim 7, wherein
the heat-storage-medium transport subsystem further comprises a flexible connector;
the flexible connector is disposed on the third pipe path, and located between the low-level tank and the high-low-level tank isolation valve.

13. The system according to claim 8, wherein
the heat-storage-medium transport subsystem further comprises a fourth valve assembly;
the fourth valve assembly is used to adjust a volume and a flow rate of a gas entering the temperature regulator;
the fourth valve assembly is disposed on the fourth pipe path.

14. The system according to claim 13, wherein
the fourth valve assembly comprises an adjustment valve and a check valve.

15. The system according to claim 4, wherein
the heat-storage-medium transport subsystem further comprises a third valve assembly;
when the first pipe path and the second pipe path share part of the pipeline, the third valve assembly is disposed on the shared pipeline.

16. The system according to claim 1, wherein the heat-storage-medium transport subsystem further comprises a conveying pump outlet recirculation valve, wherein
a second pipeline is disposed between the high-level tank and the low-level tank; one end of the second pipeline is connected with an inlet of the high-level tank, and the other end of the second pipeline is connected with an outlet of the conveying pump; the second pipeline forms a fifth pipe path, and the heat-storage-medium may be pumped into the high-level tank from the low-level tank along the fifth pipe path; the conveying pump outlet recirculation valve is disposed on the fifth pipe path.

17. The system according to claim 1, wherein the heat-storage-medium transport subsystem further comprises a second valve assembly;
the second valve assembly elevates the liquid level of the heat-storage-medium in the low-level tank by reducing the gas pressure in the low-level tank;
the low-level tank is provided with a first gas exhaust pipeline, and the first gas exhaust pipeline forms a second pipe path;
the second valve assembly is disposed on the second pipe path.

18. A heat-storage-medium conveying system for a solar-thermal power plant, comprising a high-level tank subsystem, a heat-storage-medium heat absorption subsystem and a heat-storage-medium heat exchange subsystem;
the high-level tank subsystem comprises a high-temperature heat-storage-medium high-level tank used to store a high-temperature heat-storage-medium and/or a low-temperature heat-storage-medium high-level tank used to store a low-temperature heat-storage-medium;
wherein the system further comprises a heat-storage-medium transport subsystem, and the heat-storage-medium transport subsystem comprises a high-temperature heat-storage-medium transport subsystem and/or a low-temperature heat-storage-medium transport subsystem;
the high-level tank subsystem is connected with the heat-storage-medium transport subsystem;
the high-temperature heat-storage-medium transport subsystem is disposed corresponding to the high-temperature heat-storage-medium high-level tank; the high-temperature heat-storage-medium transport subsystem comprises a high-temperature heat-storage-medium low-level tank;
a mounting height of the high-temperature heat-storage-medium low-level tank is lower than that of the high-temperature heat-storage-medium high-level tank; a volume of the high-temperature heat-storage-medium low-level tank is smaller than a volume of the high-temperature heat-storage-medium high-level tank; the high-temperature heat-storage-medium may enter the high-temperature heat-storage-medium low-level tank from the high-temperature heat-storage-medium high-level tank partially or completely by its own gravity;
the high-temperature heat-storage-medium low-level tank is provided with a high-temperature heat-storage-medium conveying pump; an outlet of the high-temperature heat-storage-medium conveying pump is connected with the heat-storage-medium heat exchange subsystem and the high-temperature heat-storage-medium high-level tank respectively; the high-temperature heat-storage-medium is pumped into the heat-storage-medium heat exchange subsystem from the high-temperature heat-storage-medium low-level tank;
the low-temperature heat-storage-medium transport subsystem is disposed corresponding to the low-temperature heat-storage-medium high-level tank; the low-temperature heat-storage-medium transport subsystem comprises a low-temperature heat-storage-medium low-level tank; a mounting height of the low-temperature heat-storage-medium low-level tank is lower than that of the low-temperature heat-storage-medium high-level tank; a volume of the low-temperature heat-storage-medium low-level tank is smaller than a volume of the low-temperature heat-storage-medium high-level tank; the low-temperature heat-storage-medium may enter the low-temperature heat-storage-medium low-level tank from the low-temperature heat-storage-medium high-level tank partially or completely by its own gravity;
the low-temperature heat-storage-medium low-level tank is provided with a low-temperature heat-storage-medium conveying pump, and an outlet of the low-temperature heat-storage-medium conveying pump is connected with the heat-storage-medium heat absorption subsystem and the low-temperature heat-storage-medium high-level tank respectively; the low-temperature heat-storage-medium is pumped into the heat-storage-medium heat absorption subsystem from the low-temperature heat-storage medium low-level tank.

* * * * *